United States Patent Office 2,695,883
Patented Nov. 30, 1954

2,695,883

PROCESS FOR BREAKING PETROLEUM EMULSIONS

Alvin Howard Smith, Kirkwood, Mo., assignor to Petrolite Corporation, a corporation of Delaware No Drawing. Application April 10, 1952,
Serial No. 281,647

12 Claims. (Cl. 252—340)

This invention relates to processes or procedures particularly adapted for preventing, breaking or resolving emulsions of the water-in-oil type, and particularly petroleum emulsions.

Complementary to the above aspect of my present invention is my companion invention concerned with the new chemical products or compounds used as the demulsifying agents in said aforementioned processes or procedures, as well as the application of such chemical compounds, products and the like, in various other arts and industries, along with the method for manufacturing said new chemical products or compounds which are of outstanding value in demulsification. See my co-pending application, Serial No. 281,648, filed April 10, 1952.

My invention provides an economical and rapid process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constituted the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts, from pipeline oil.

More specifically, the present invention is concerned with processes for breaking petroleum emulsions of the water-in-oil type characterized by subjecting the emulsion to the action of a demulsifier including hydrophile synthetic products; said hydrophile synthetic products being acidic fractional esters obtained by reaction between (A) a polycarboxy acid, and (B) excessively oxypropylated triricinolein which is commercially available as castor oil, with the proviso that (1) there be introduced at least 20 moles and preferably not over 50 moles, and generally not over 40 moles, of propylene oxide per ricinoleyl radical, and that (2) there be employed at least one mole of the carboxy reactant for each reactive hydroxyl radical.

It is understood that castor oil which is the commercial form of triricinolein contains small amounts of other fatty acid radicals insofar that commercial castor oil is apt to comprise from slightly over 85% to slightly over 90% ester of ricinoleic acid. However, the reference to the ricinoleic or the ricinoleyl radical means the mixed fatty acids present in castor oil for the reason that for all practical purposes they are 85%–90% or more triricinolein. Needless to say, castor oil can be purified or separated so as to yield pure ricinoleic acid which could be esterified to produce a glyceride containing 90% or more of triricinolein. Such procedures would be expensive and there is no justification for them. Thus, for the present purpose castor oil and triricinolein are considered synonymous.

The oxyalkylation of castor oil appears to be more complicated than indicated by initial examination. Originally it was believed that the oxyalkylation and particularly the oxyethylation of castor oil, since it yielded a water-soluble product in the case of ethylene oxide, involved the hydroxyl group of the ricinoleyl radical. Subsequently it was found, as is well known, that non-hydroxylated glycerides, for instance, olein, also can be solubilized by the use of ethylene oxide and it is now believed that the reaction takes place under such circumstances at the ester linkage. It is believed, also, that in the oxyalkylation of castor oil the ester linkage seems to be more susceptible to oxyalkylation than the secondary alcohol group. However, depending on circumstances there may be some oxypropylation taking place at the secondary alcoholic linkage.

The oxyethylation of castor oil is well known, particularly with ethylene oxide, in order to obtain a water-soluble or water-emulsifiable product. All that is required is a comparatively low ratio of ethylene oxide per ricinoleyl radical, for instance, about 3 or 4 moles per ricinoleyl radical. Sometimes mixtures of both propylene oxide and ethylene oxide have been used to obtain a product which was still water-soluble and water-emulsifiable. In some instances castor oil has been reacted with a comparatively low ratio of propylene oxide, for instance, several moles per ricinoleyl radical.

As far as I am aware no previous effort has been made to react castor oil with the excessive amount of propylene oxide which I introduce to give a decided hydrophobe effect. For instance, one mole of castor oil has been treated with 40 moles of propylene oxide. I have found that this amount is insufficient for my purpose. Compounds or demulsifying agents derived from castor oil which has been treated with as little as 40 moles of propylene oxide per mole of triricinolein are not suitable. Indeed, my lower limit is approximately 50% higher and the upper limit is approximately three times this amount, i. e., 60 to 120 moles of propylene oxide per mole of triricinolein or castor oil.

Exploring what has been said just previously, and in order to point out the nature of the oxypropylation product which I employ as an intermediate it may be well to re-examine the difference in action as far as water-solubility goes between ethylene oxide and propylene oxide. If a water-soluble substance, such as water itself, is treated with ethylene oxide the resultant or mixture of compounds so obtained continues to be water-soluble to a high molecular weight range, for instance, 2,000. If, on the other hand, propylene oxide is used instead of ethylene oxide, then and in that event approximately 12 moles or more of propylene oxide are introduced per hydrophile unit and water-insolubility results. For example, compare the water-insolubility of polypropyleneglycol of a molecular weight of approximately 600 or 650, with polyethyleneglycol having twice this molecular weight. In other words, a molecular weight of 600 or thereabouts means the introduction of about 10, 11 or 12 moles of propylene oxide per mole of water, so as to obtain a water-insoluble and substantially oil-soluble polyglycol.

If one momentarily considers triricinolein in terms of ricinoleic acid what has been said previously may be presented in simpler language. Ricinoleic acid is, of course, water-insoluble. If reacted with 10, 11, 12 or 13 moles of propylene oxide the resultant fractional ester is essentially more insoluble than the original ricinoleic acid if such terminology can be employed for the instant description. In other words, the introduction of 10, 11, 12 or 13 moles of propylene oxide are sufficient to render a water-soluble material (even water itself) water-insoluble and oil-soluble.

As previously pointed out, this appears to be the previously used upper limit as far as I am aware in the oxypropylation of castor oil, i .e., roughly 40 moles of propylene oxide per mole of castor oil. In order to obtain a suitable raw material here the amount used must be significantly beyond this range, i. e., 60 to 120 moles of propylene oxide per mole of castor oil.

Referring again to triricinolein or castor oil, I have employed an amount of propylene oxide which is not only sufficient to change a water-soluble compound, such as water, into a water-insoluble compound but in proportion I use at least 50% more and in some instances three times as much. In other words, instead of 35 to 40 moles of propylene oxide per mole of castor oil, my minimum is 50% more, i. e., 60 moles, or as much as 120 moles. In other words, I have employed an amount of propylene oxide to produce excessive oxypropylation, i. e., a minimum of 20 moles per mole of ricinoleic acid in order to produce an excessive hydrophobe effect per ricinoleyl radical in the manner previously referred to, i. e., a hydrophobe effect which is at least 50% more than would be required to convert water into a water-insoluble material.

I wish to emphasize, as far as I am aware, such excessive oxypropylation of castor oil has not been previously recorded. It is this excessive oxypropylation in combination with the polycarboxy reactant which gives the valuable demulsifier as indicated by tests recorded subsequently in the instant specification.

As pointed out previously it is impossible to indicate exactly the products obtained by the oxypropylation of castor oil in light of the fact that the reactions are not clearly understood and also in light of two other facts which are brought out in Part 2, subsequently: (a) that one does not obtain a single compound in oxyalkylation and particularly oxypropylation but one obtains a cogeneric mixture, and (b) it has long been recognized that certain unpreventable side reactions take place.

Having obtained the oxypropylated castor oil previously described and hereinafter illustrated in detail, the next step is esterification involving a polycarboxy acid and preferably a dicarboxy acid or reactant in a molal ratio to insure that the final product is an acidic fractional ester obtained by the use of one mole of the polycarboxy reactant for each hydroxyl radical.

For convenience, what is said hereinafter will be divided into four parts:

Part 1 is concerned with the oxypropylation of castor oil;

Part 2 is concerned with the formation of the acidic ester from the oxypropylated castor oil described in Part 1, preceding;

Part 3 is concerned with the nature of the oxypropylated derivatives insofar that a cogeneric mixture is invariably obtained; and Part 4 is concerned with a process for breaking oil field or similar emulsions by means of the acidic esters as described in Part 2, preceding.

PART 1

As has been pointed out previously the initial reaction involves castor oil (triricinolein) and propylene oxide. Broadly speaking, as has been stated previously, the oxypropylation of castor oil is well known and has been described in the patent literature; for instance, see U. S. Patent No. 2,233,382 dated February 25, 1941, and U. S. Patent No. 2,281,419, dated April 28, 1942.

Also, as previously pointed out, I have found that instead of introducing approximately 13 moles of propylene oxide per ricinoleyl radical it is necessary to introduce at least fifty per cent more (20 moles) to obtain a suitable raw material for subsequent esterification. Therefore, the actual procedure employed is the well known oxypropylation procedure with the proviso that it is carried out to a stage which, as has been previously stated, has not been recorded in the literature as far as I am aware.

Example 1a

The particular autoclave used was one with a capacity of approximately 15 gallons or on the average of about 125 pounds of reaction mass. The speed of the stirrer could be varied from 150 to 350 R. P. M. The initial charge was 35 pounds of castor oil and 1.05 pounds powdered caustic as catalyst. The reaction pot was flushed out with nitrogen, the autoclave sealed, and the automatic devices adjusted and set for injecting 90.2 pounds of propylene oxide in an 8-hour period. The pressure regulator was set for a maximum of 35–37 pounds per square inch. However, in this particular step and in all succeeding steps the pressure never got over about 32 pounds per square inch. In fact, this meant that the bulk of the reaction could take place and did take place at an appreciably lower pressure. The propylene oxide was added at a rate of about 11 pounds per hour and at a comparatively moderate temperature, to wit, about 250°–255° F. (moderately higher than the boiling point of water). The initial introduction of propylene oxide did not start until the heating devices had raised the temperature to 245° F. At the completion of the reaction a sample as taken and oxypropylation proceeded as in Example 2a immediately following.

Example 2a 63 pounds of the reaction mass identified as Example 1a, preceding, and equivalent to 17.5 pounds of castor oil, 45 pounds of propylene oxide, and .52 pound of catalyst were subjected to oxyalkylation with 27.02 pounds of propylene oxide.

The oxypropylation was conducted in substantially the same manner in regard to temperature and pressure as in Example 1a, preceding. Due to the smaller amount of propylene oxide introduced the time period was much shorter, to wit, 5 hours. The rate of oxide introduction was about 5 pounds per hour. At the end of the reaction period part of the sample was withdrawn and oxypropylation continued as in Example 3a, immediately following.

Example 3a 85 pounds of the reaction mass identified as Example 2a, preceding, and equivalent to 16.52 pounds of castor oil, 68 pounds of propylene oxide, and .49 pound of catalyst, were permitted to stay in the autoclave. 6.39 pounds of propylene oxide were introduced in a 2-hour period. No additional catalyst was added.

The conditions of reaction as far as temperature and pressure were concerned were substantially the same as in Example 1a, preceding. The propylene oxide was added at the rate of about 3 pounds per hour. At the completion of the reaction part of the reaction mass was withdrawn and the remainder subjected to further oxypropylation as described in Example 4a, immediately following.

Example 4a 80.00 pounds of the reaction mass identified as Example 3a, preceding, and equivalent to 14.49 pounds of castor oil, 65.1 pounds of propylene oxide, and .43 pound of catalyst were permitted to stay in the autoclave. No additional catalyst was added.

The conditions in regard to temperature and pressure were substantially the same as in Example 1a, preceding. In this instance the oxide was added in 4 hours. The amount of oxide added was 14 pounds. The addition was at the rate of about 3 pounds per hour.

Example 5a 80 pounds of reaction mass identified as Example 4a, preceding and equivalent to 10.72 pounds of castor oil, 67.35 pounds propylene oxide and .37 pound of catalyst, were left in the reaction vessel. To this reaction mass were added 11.92 pounds of propylene oxide at the rate of 4 pounds per hour. The reaction time was 3½ hours. Conditions were essentially the same as in the preceding examples.

Example 6a 80.00 pounds of the reaction mass identified as Example 5a, preceding, and equivalent to 10.72 pounds of castor oil, 69 pounds of propylene oxide, and .32 pound of catalyst, were permitted to stay in the autoclave. No additional catalyst was added.

The condition in regard to temperature and pressure were substantially the same as in Example 1a, preceding. In this instance the oxide was added in 4 hours. The amount of oxide added was 10.4 pounds. The addition was at the rate of about 3 pounds per hour.

What has been said herein is presented in tabular form in Table 1 immediately following with some added information as to theoretical molecular weight, hydroxyl number, etc. Also, other examples have been presented in this table as it is not necessary to cite them all in detail as has been done with the preceding examples.

TABLE 1

| Ex. No. | Composition before | | | Composition after | | | Theo. mol. wt. | OH value | Max. temp., °F. | Max. pres., p. s. i. g. | Time, hrs. |
|---|---|---|---|---|---|---|---|---|---|---|---|
| | Castor oil, lbs. | Propy. oxide, lbs. | Catalyst, lbs. | Castor oil, lbs. | Prop. oxide, lbs. | Catalyst, lbs. | | | | | |
| 1a | 35.00 | | 1.05 | 35.00 | 90.2 | 1.05 | 3,220 | 76 | 250-255 | 35-37 | 8 |
| 2a | 17.50 | 45.00 | .52 | 17.50 | 72.02 | .52 | 4,610 | 65 | 250-255 | 35-37 | 5 |
| 3a | 16.52 | 68.00 | .49 | 16.52 | 74.39 | .49 | 4,960 | 59 | 250-255 | 35-37 | 2 |
| 4a | 14.49 | 65.10 | .43 | 14.49 | 79.10 | .43 | 5,830 | 54 | 250-255 | 35-37 | 4 |
| 5a | 12.32 | 67.35 | .37 | 12.32 | 79.27 | .37 | 6,700 | 52 | 250-255 | 35-37 | 3½ |
| 6a | 10.72 | 69.00 | .32 | 10.72 | 79.40 | .32 | 7,570 | 50 | 250-255 | 35-37 | 4 |

Attention is called to the fact that Example 1a shown both in Table 1 and in the detailed examples preceding, is not intended to illustrate this invention. Examples 2a through 6a are, of course, intended to illustrate this invention. With regard to Example 1a, it will be shown later in Part 4 that the amount of propylene oxide used in Example 1a is not satisfactory for the present invention.

The final product, i. e., at the end of the oxypropylation step, was a somewhat viscous, amber-colored fluid. In general the color gradually lightens as oxypropylation proceeds. The products were water-insoluble at all stages, of course, but became xylene- and even kerosene-soluble after a molecular weight of 20,000 or thereabouts had been reached and passed. The hydroxyl value mentioned in the above table immediately preceding were determined by the standard Verley-Bolsing method. This value is sometimes referred to as acetyl value and is a well known determination in the art. It is to be noted that there is no complete conversion of propylene oxide into the desired hydroxylated compounds. This is indicated by the fact that the theoretical molecular weight based on a statistical average is greater than the molecular weight when calculated on the basis of acetyl or hydroxyl value.

The fact that such pronounced variation takes place between hydroxyl molecular weight and theoretical molecular weight, based on completeness of reaction, has been subjected to examination and speculation, but no satisfactory rationale has been suggested.

One suggestion has been that one hydroxyl is lost by dehydration and that this ultimately causes a break in the molecule in such a way that two new hydroxyls are formed. This is shown after a fashion in a highly idealized manner in the following way:

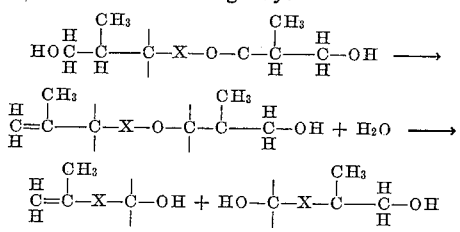

In the above formulas the large X obviously is not intended to signify anything except the central part of a large molecule, whereas, as far as a speculative explanation is concerned, one need only consider the terminal radicals as shown. Such suggestion is of interest only because it may be a possible explanation of how an increase in hydroxyl value does take place which could be interpreted as a decrease in molecular weight. This matter is considered subsequently in Part 3. Formation of cyclic alkylene oxide polymers, if not reactive towards polycarboxy acids, presumably would have the effect of decreasing the apparent hydroxyl value.

Actually, there is no completely satisfactory method for determining the molecular weights of these types of compounds with a high degree of accuracy. In some instances the acetyl value or hydroxyl value serves as satisfactorily as an index to the molecular weight as any other procedure due to the above limitations, and especially in the higher molecular weight range. If any difficulty is encountered in the manufacture of the esters as described in Part 2, preceding, a stoichiometrical amount of acid or acid compound should be taken which corresponds to the indicated acetyl or hydroxyl value. This matter has been discussed in the literature and is a matter of common knowledge and requires no further elaboration.

In the above table the time factors mentioned are generally longer than would ordinarily be required. Needless to say, the oxypropylation rate can be sped up by increasing the agitation or the temperature and by a choice of suitable reaction vessels. However, as it is sometimes desirable to allow the reaction mass to stir for as long as a half-hour to one hour before drawing a sample after the addition of propylene oxide has stopped, these time factors are not considered excessive. I have chosen them at my own preference and they can be varied moderately one way or the other, depending on one's inclination.

PART 2

As previously pointed out, the present invention is concerned with acidic esters obtained from the oxypropylated derivatives described in Part 1, preceding, and polycarboxy acids, particularly tricarboxy acids like citric, and dicarboxy acids such as adipic acid, phthalic acid, or anhydride, succinic acid, diglycollic acid, sebacic acid, azelaic acid, aconitic acid, maleic acid, or anhydride, citraconic acid or anhydride, maleic acid or anhydride adducts, as obtained by the Diels-Alder reaction from products such as maleic anhydride, and cyclopentadiene. Such acids should be heat-stable so they are not decomposed during esterification. They may contain as many as 36 carbon atoms, as, for example, the acids obtained by dimerization of unsaturated fatty acids, unsaturated monocarboxy fatty acids, or unsaturated monocarboxy acids having 18 carbon atoms. Reference to the acid in the hereto appended claims obviously includes the anhydrides or any other obvious equivalents. My preference, however, is to use polycarboxy acids having not over 8 carbon atoms.

The production of esters including acid esters (fractional esters) from polycarboxy acids and glycols, or other hydroxylated compounds, is well known. Needless to say, various compounds may be used such as the low molal ester, the anhydride, the acyl chloride, etc. However, for purpose of economy it is customary to use either the acid or the anhydride. A conventional procedure is employed. On a laboratory scale one can employ a resin pot of the kind described in U. S. Patent No. 2,499,370, dated March 7, 1950, to De Groote and Keiser, and particularly with one more opening to permit the use of a porous spreader if hydrochloric acid gas is used as a catalyst. Such device or absorption spreader consists of minute Alundum thimbles which are connected to a gas tube. One can add a sulfonic acid such as paratoluene sulfonic acid as a catalyst. There is some objection to this because in some instances there is some evidence that this acid catalyst tends to decompose or rearrange heat-oxypropylated compounds. It is particularly likely to do so if the esterification temperature is too high. In the case of polycarboxy acids such as diglycollic acid which is strongly acidic there is no need to add any catalyst. The use of hydrochloric acid gas has one advantage over paratoluene sulfonic acid and that is that at the end of the reaction it can be removed by flushing out with nitrogen, whereas there is no reasonably convenient means available of removing the paratoluene sulfonic acid or other sulfonic acid employed. If hydrochloric acid is employed one need only pass the gas through at an exceedingly slow rate so as to keep the reaction mass acidic. Only a trace of acid need be present. I have employed hydrochloric acid gas or the aqueous acid itself to eliminate the initial basic material. My preference, however, is to use no catalyst whatsoever and to insure complete dryness of the poly-ol, as described in the final procedure just preceding Table 2.

The products obtained in Part 1, preceding, may contain a basic catalyst. As a general procedure, I have added an amount of half-concentrated hydrochloric acid considerably in excess of what is required to neutralize the residual catalyst. The mixture is shaken thoroughly and allowed to stand overnight. It is then filtered and refluxed with the xylene present until the water can be separated in a phase-separating trap. As soon as the product is substantially free from water the distillation stops. This preliminary step can be carried out in the flask to be used for esterification. If there is any further deposition of sodium chloride during the reflux stage, needless to say, a second filtration may be required. In any event, the neutral or slightly acidic solution of the oxypropylated derivatives described in Part 1 is then diluted further with sufficient xylene, decalin, petroleum solvent, or the like, so that one has obtained approximately a 45%–65% solution. To this solution there is added a polycarboxylated reactant, as previously described, such as phthalic anhydride, succinic acid, or anhydride, diglycollic acid, etc. The mixture is refluxed until esterification is complete, as indicated by elimination of water or drop in carboxyl value. Needless to say, if one produces a half-ester from an anhydride such as phthalic anhydride, no water is eliminated. However, if it is obtained from diglycollic acid, for example, water is eliminated. All such procedures are conventional and have been so thoroughly described in the literature that further consideration will be limited to a few examples and a comprehensive table.

Other procedures for eliminating the basic residual catalyst, if any, can be employed. For example, the oxyalkylation can be conducted in absence of a solvent or the solvent removed after oxypropylation. Such oxypropylation end-product can then be acidified with just enough concentrated hydrochloric acid to just neutralize the residual basic catalyst. To this product one can then add a small amount of anhydrous sodium sulfate (sufficient in quantity to take up any water that is present) and then subject the mass to centrifugal force so as to eliminate the hydrated sodium sulfate and probably the sodium chloride formed. The clear, somewhat viscous, straw-colored amber liquid so obtained may contain a small amount of sodium sulfate or sodium chloride, but in any event is perfectly acceptable for esterification in the manner described.

It is to be pointed out that the products here described are not polyesters in the sense that there is a plurality of both poly-ol radicals and acid radicals; the product is characterized by having only one poly-ol radical.

In some instances and, in fact, in many instances, I have found that in spite of the dehydration methods employed above, a mere trace of water still comes through, and that this mere trace of water certainly interferes with the acetyl or hydroxyl value determination, at least when a number of conventional procedures are used and may retard esterification, particularly where there is no sulfonic acid or hydrochloric acid present as a catalyst. Therefore, I have preferred to use the following procedure: I have employed about 200 grams of the poly-ol compound, as described in Part I, preceding: I have added about 60 grams of benzene and refluxed this mixture in the glass resin pot, using a phase-separating trap, until the benzene carried out all the water present as water of solution or the equivalent. Ordinarily this refluxing temperature is apt to be in the neighborhood of 130° C. to possibly 150° C. When all this water or moisture has been removed I also withdraw approximately 20 grams, or a little less, benzene and then add the required amount of the carboxy reactant and also about 150 grams of a high-boiling aromatic petroleum solvent. These solvents are sold by various oil refineries and, as far as solvent effect goes, act as if they were almost completely aromatic in character. Typical distillation data in the particular type I have employed and found very satisfactory is the following:

I. B. P., 142° C.  50 ml., 242° C.
5 ml., 200° C.    55 ml., 244° C.
10 ml., 209° C.   60 ml., 248° C.
15 ml., 215° C.   65 ml., 282° C.
20 ml., 216° C.   70 ml., 252° C.
25 ml., 220° C.   75 ml., 260° C.
30 ml., 225° C.   80 ml., 264° C.
35 ml., 230° C.   85 ml., 270° C.
40 ml., 234° C.   90 ml., 280° C.
45 ml., 237° C.   95 ml., 307° C.

After this material is added refluxing is continued and, of course, is at a high temperature, to wit, about 160° to 170° C. If the carboxy reactant is an anhydride, needless to say, no water of reaction appears; if the carboxy reactant is an acid, water of reaction should appear and should be eliminated at the above reaction temperature. If it is not eliminated, I simply separate out another 10 to 20 cc. of benzene by means of the phase-separating trap and thus raise the temperature to 180° or 190° C., or even to 200° C., if need be. My preference is not to go above 200° C.

The use of such solvent is extremely satisfactory, provided one does not attempt to remove the solvent subsequently, except by vacuum distillation, and provided there is no objection to a little residue. Actually, when these materials are used for a purpose, such as demulsification, the solvent might just as well be allowed to remain. If the solvent is to be removed by distillation, and particularly vacuum distillation, then the high boiling aromatic petroleum solvent might well be replaced by some more expensive solvent, such as decalin or an alkylated decalin which has a rather definite or close range boiling point. The removal of the solvent, of course, is purely a conventional procedure and requires no elaboration.

When starting with the castor oil product, as herein described, the raw material, I have found that xylene by itself is practically or almost as satisfactory as other solvents or mixtures. Decalin also is suitable. Actually, at times there is some advantage in using a mixture of a high-boiling aromatic petroleum solvent and xylene in preparation of other typical examples of the kind herein described.

The data included in the subsequent tables, i. e., Tables 2 and 3, are self-explanatory and very complete and it is believed no further elaboration is necessary.

The procedure for manufacturing the esters has been illustrated by preceding examples. If for any reason reaction does not take place in a manner that is acceptable, attention should be directed to the following details:

(a) Recheck the hydroxyl or acetyl value of the oxypropylated material as in Part 1, preceding;

(b) If the reaction does not proceed with reasonable speed, either raise the temperature indicated or else extend the period of time up to 12 or 16 hours if need be;

(c) If necessary, use ½% of paratoluene sulfonic acid, or some other acid, as a catalyst; and

TABLE 2

| Ex. No. of acid ester | Ex. No. of hydroxy cmpd. | Theo. molec. wt. of hyd. cmpd. | Actual hydroxyl value | Amt. of hydroxy cmpd. (grs.) | Polycarboxy reactant | Amt. of polycarboxy reactant (grs.) |
|---|---|---|---|---|---|---|
| 1b | 1a | 3,220 | 76 | 100 | Phthalic anhydride | 20.0 |
| 2b | 1a | 3,220 | 76 | 100 | Maleic anhydride | 13.3 |
| 3b | 1a | 3,220 | 76 | 100 | Succinic acid | 16.0 |
| 4b | 1a | 3,220 | 76 | 100 | Citraconic anhydride | 15.2 |
| 5b | 1a | 3,220 | 76 | 100 | Diglycolic acid | 18.2 |
| 6b | 2a | 4,610 | 65 | 130 | Phthalic anhydride | 22.3 |
| 7b | 2a | 4,610 | 65 | 130 | Maleic anhydride | 14.8 |
| 8b | 2a | 4,610 | 65 | 130 | Succinic acid | 17.8 |
| 9b | 2a | 4,610 | 65 | 130 | Citraconic anhydride | 16.9 |
| 10b | 2a | 4,610 | 65 | 130 | Diglycolic acid | 20.2 |
| 11b | 3a | 4,960 | 59 | 150 | Phthalic anhydride | 23.4 |
| 12b | 3a | 4,960 | 59 | 150 | Maleic anhydride | 15.5 |
| 13b | 3a | 4,960 | 59 | 150 | Succinic acid | 18.6 |
| 14b | 3a | 4,960 | 59 | 150 | Citraconic anhydride | 17.7 |
| 15b | 3a | 4,960 | 59 | 150 | Diglycolic acid | 21.2 |
| 16b | 4a | 5,830 | 54 | 170 | Phthalic anhydride | 24.2 |
| 17b | 4a | 5,830 | 54 | 170 | Maleic anhydride | 16.0 |
| 18b | 4a | 5,830 | 54 | 170 | Succinic acid | 19.3 |
| 19b | 4a | 5,830 | 54 | 170 | Citraconic anhydride | 18.3 |
| 20b | 4a | 5,830 | 54 | 170 | Diglycolic acid | 21.9 |
| 21b | 5a | 6,700 | 52 | 170 | Phthalic anhydride | 23.3 |
| 22b | 5a | 6,700 | 52 | 170 | Maleic anhydride | 15.4 |
| 23b | 5a | 6,700 | 52 | 170 | Succinic acid | 18.6 |
| 24b | 5a | 6,700 | 52 | 170 | Citraconic anhydride | 17.6 |
| 25b | 5a | 6,700 | 52 | 170 | Diglycolic acid | 21.1 |
| 26b | 6a | 7,570 | 50 | 170 | Phthalic anhydride | 22.4 |
| 27b | 6a | 7,570 | 50 | 170 | Maleic anhydride | 14.8 |
| 28b | 6a | 7,570 | 50 | 170 | Aconitic acid | 17.9 |
| 29b | 6a | 7,570 | 50 | 170 | Citraconic anhydride | 16.9 |
| 30b | 6a | 7,570 | 50 | 170 | Diglycolic acid | 20.2 |

TABLE 3

| Ex. No., acid ester | Solvent | Amount solvent (grs.) | Maximum esterification temp., °C. | Esterification time, hrs. | Water out (cc.) |
|---|---|---|---|---|---|
| 1b | Xylene | 120.0 | 160 | 6 | |
| 2b | do | 113.0 | 160 | 1½ | |
| 3b | do | 113.5 | 160 | 6 | 2.5 |
| 4b | do | 115.0 | 160 | 5 | |
| 5b | do | 115.7 | 160 | 6 | 2.5 |
| 6b | do | 152.3 | 160 | 6 | |
| 7b | do | 145.0 | 160 | 2 | |
| 8b | do | 145.0 | 160 | 5 | 2.8 |
| 9b | do | 147.0 | 160 | 5 | |
| 10b | do | 147.5 | 160 | 5 | 2.7 |
| 11b | do | 173.4 | 160 | 6 | |
| 12b | do | 165.5 | 160 | 2½ | |
| 13b | do | 166.0 | 160 | 6 | 2.9 |
| 14b | do | 167.7 | 160 | 6 | |
| 15b | do | 168.2 | 160 | 6 | 3.0 |
| 16b | do | 194.2 | 160 | 6 | |
| 17b | do | 186.0 | 160 | 3 | |
| 18b | do | 186.4 | 160 | 7 | 2.9 |
| 19b | do | 188.3 | 160 | 6 | |
| 20b | do | 188.9 | 160 | 7 | 3.0 |
| 21b | do | 193.3 | 160 | 8 | |
| 22b | do | 135.4 | 160 | 3 | |
| 23b | do | 186.0 | 160 | 8 | 2.8 |
| 24b | do | 187.6 | 160 | 8 | |
| 25b | do | 188.3 | 160 | 8 | 2.8 |
| 26b | do | 192.4 | 160 | 8 | |
| 27b | do | 184.8 | 160 | 3 | |
| 28b | do | 185.3 | 160 | 8 | 2.6 |
| 29b | do | 186.9 | 160 | 8 | |
| 30b | do | 187.5 | 160 | 8 | 2.7 |

NOTE.—In Tables 2 and 3, as mentioned in Table 1, Examples 1b through 5b are not intended to illustrate this invention, but are only to serve as a comparison with the other examples. This comparison will be exemplified in Part 4.

(d) If the esterification does not produce a clear product, a check should be made to see if an inorganic salt such as sodium chloride or sodium sulfate is not precipitating out. Such salt should be eliminated, at least for exploration experimentation, and can be removed by filtering.

Everything else being equal, as the size of the molecule increases and the reactive hydroxyl radical represents a smaller fraction of the entire molecule, more difficulty is involved in obtaining complete esterification.

Even under the most carefully controlled conditions of oxypropylation involving comparatively low temperatures and long time of reaction, there are formed certain compounds whose compositions are still obscure. Such side reaction products can contribute a substantial proportion of the final cogeneric reaction mixture. Various suggestions have been made as to the nature of these compounds, such as being cyclic polymers of propylene oxide, dehydration products with the appearance of a vinyl radical, or isomers of propylene oxide or derivatives thereof, i. e., of an aldehyde, ketone, or allyl alcohol. In some instances an attempt to react the stoichiometric amount of a polycarboxy acid with the oxypropylated derivative results in an excess of the carboxylated reactant, for the reason that apparently under conditions of reaction less reactive hydroxyl radicals are present than indicated by the hydroxyl value. Under such circumstances there is simply a residue of the carboxylic reactant which can be removed by filtration, or, if desired, the esterification procedure can be repeated, using an appropriately reduced ratio of carboxylic reactant.

Even the determination of the hydroxyl value and conventional procedure leaves much to be desired, due either to the cogeneric materials previously referred to, or, for that matter, the presence of any inorganic salts or propylene oxide. Obviously this oxide should be eliminated.

The solvent employed, if any, can be removed from the finished ester by distillation, and particularly vacuum distillation. The final products or liquids are generally from almost black or reddish-black to dark amber in color, and show moderate viscosity. They can be bleached with bleaching clays, filtering chars, and the like. However, for the purpose of demulsification or the like, color is not a factor and decolorization is not justified.

In the above instances I have permitted the solvents to remain present in the final reaction mass. In other instances I have followed the same procedure, using decalin or a mixture of decalin or benzene in the same manner and ultimately removed all the solvents by vacuum distillation.

PART 3

As previously mentioned, triricinolein may not only oxyalkylate on the secondary hydroxyl groups but also on the ester linkages. If one were concerned with a monohydroxylated material or a dihydroxylated material only, one might be able to write a formula which in essence would represent the particular product. However, in a more highly hydroxylated material the problem becomes increasingly more difficult for reasons which have already been indicated in connection with oxypropylation and which can be examined by merely considering for the moment a monohydroxylated material.

Oxyalkylation, particularly in any procedure which involves the introduction of repetitious other linkages, i. e., excessive oxyalkylation, using, for example, ethylene oxide, propylene oxide, etc., runs into difficulties of at least two kinds; (a) formation of a cogeneric mixture rather than a single compound, and (b) excessive side reactions or the like. The former phase will be considered in the paragraphs following. As to the latter phase, see U. S. Patent No. 2,236,919 dated April 1, 1941, to Reynhart.

Oxypropylation involves the same sort of variations as appear in preparing high molal polypropylene glycols. Propylene glycol has a secondary alcoholic radical and a primary alcohol radical. Obviously then polypropylene glycols could be obtained, at least theoretically, in which two secondary alcoholic groups are united or a secondary alcohol group is united to a primary alcohol, group, etherization being involved, of course, in each instance. Needless to say, the same situation applies when one has oxypropylated polyhydric materials having 4 or more hydroxyls, or the obvious equivalent.

Usually no effort is made to differentiate between oxypropylation taking place, for example, at the primary alcohol radical or the secondary alcohol radical. Actually, when such products are obtained, such as a high molal propylene glycol or the products obtained in the manner herein described one does not obtain a single derivative such as $HO(RO)_nH$ or $—(RO)_nH$ in which $n$ has one and only one value, for instance, 14, 15 or 16, or the like. Rather, one obtains a cogeneric mixture of closely related or touching homologues. These materials invariably have high molecular weights, and cannot be separated from one another by any known procedure, without decomposition. The proportion of such mixture represents the contribution of the various individual members of the mixture. On a statistical basis, of course, $n$ can be appropriately specified. For practical purposes one need only consider the oxypropylation of a monohydric alcohol because in essence this is substantially the mechanism involved. Even in such instances where one is concerned with a monohydric reactant one cannot draw a single formula and say that by following such procedure one can readily obtain 80% or 90% or 100% of such compound. However, in the case of at least monohydric initial reactants one can readily draw the formulas of a large number of compounds which appear in some of the probable mixtures or can be prepared as components and mixtures which are manufactured conventionally.

Simply by way of illustration reference is made to U. S. Patent No. 2,549,434, dated April 17, 1951, to De Groote, Wirtel and Pettingill.

However, momentarily referring again to a monohydric initial reactant it is obvious that if one selects any such simple hydroxylated compound and subjects such compound to oxyalkylation, such as oxyethylation, or oxypropylation, it becomes apparent that one is really producing a polymer of the alkylene oxide except for the terminal group. This is particularly true where the amount of oxide added is comparatively large, for instance, 10, 20, 30, 40 or 50 units. If such compound is subjected to oxyethylation so as to introduce 30 units of ethylene oxide, it is well known that one does not obtain a single constituent which, for the sake of convenience, may be indicated as $RO(C_2H_4O)_{30}OH$. Instead, one obtains a cogeneric mixture of closely related homologues in which the formula may be shown as the following: $RO(C_2H_4O)_nH$, wherein $n$, as far as the statistical average goes, is 30, but the individual members present in significant amount may vary from instances where $n$ has a value of 25, and perhaps less, to a point where $n$ may represent 35 or more. Such mixture is, as stated, a cogeneric closely related series of touching homologous compounds. Considerable investigation has been made in regard to the distribution curves for linear polymers. Attention is directed to the article entitled "Fundamental Principles of Condensation Polymerization," by Flory, which appeared in Chemical Reviews, volume 39, No. 1, page 137.

Unfortunately, as has been pointed out by Flory and other investigators, there is no satisfactory method, based on either experimental or mathematical examination, of indicating the exact proportion of the various members of touching homologous series which appear in cogeneric condensation products of the kind described. This means that from the practical standpoint, i. e., the ability to describe how to make the product under consideration and how to repeat such production time after time without difficulty, it is necessary to resort to some other method of description; or else consider the value of $n$, in formulas such as those which have appeared previously and which appear in the claims, as representing both individual constituents in which $n$ has a single definite value, and also with the understanding that $n$ represents the average statistical value based on the assumption of completeness of reaction.

This may be illustrated as follows: Assuming that in any particular example the molal ratio of propylene oxide per hydroxyl is 15 to 1. In a generic formula 15 to 1 could be 10, 20 or some other amount and indicated by $n$. Referring to this specific case actually one obtains products in which $n$ probably varies from 10 to 20, perhaps even further. The average value, however, is 15, assuming, as previously stated, that the reaction is complete. The product shown by the formula is perhaps best described also in terms of method of manufacture.

It becomes obvious that when carboxylic acidic esters are prepared from such high molal molecular weight materials that the ultimate esterification product must, in turn, be a cogeneric mixture. Likewise, it is obvious that the contribution to the total molecular weight made by the polycarboxy reactant is small. Thus, one might expect that the effectiveness of the demulsifier in the form of the acidic fractional ester would be comparable to the esterified hydroxylated material. Remarkably enough, in practically every instance the product is distinctly better, and in the majority of instances much more effective.

PART 4

In practicing my process for resolving petroleum emulsions, I use my demulsifying agents according to conventional procedures, such as any of those referred to in columns 21 through 23 of Patent 2,602,064, July 1, 1952.

The products herein described may be used not only in diluted form, but also may be used admixed with some other chemical demulsifier. A mixture which illustrates such combination is the following:

Oxyalkylated derivative, for example, the product of Example 21b, 20%;

A cyclohexylamine salt of a polypropylated naphthalene monosulfonic acid, 24%;
An ammonium salt of a polypropylated naphthalene monosulfonic acid, 24%;
A sodium salt of oil-soluble mahogany petroleum sulfonic acid, 12%;
A high-boiling aromatic petroleum solvent, 15%;
Isopropyl alcohol, 5%.

The above proportions are all weight percents.

Emphasis is again directed to what has been said previously, to wit, that excessive oxypropylation, for instance, 60 to 120 moles of propylene oxide per castor oil group (approximately 20 to 40 moles of propylene oxide per ricinoleyl radical) yields a product or cogeneric mixture which of itself apparently has inherently different properties than a product obtained by a lower stage oxypropylation as, for example, 40 moles per mole of castor oil or 13 moles per ricinoleyl radical. Whatever the difference is, which is unexplainable, the fact remains that when two such products, one being a low, moderate or high oxypropylation and the other being an excessively high oxypropylation as herein described, are converted into acidic fractional esters as described in part 2, the resultant products, i. e., the acidic esters act entirely differently on emulsions. I am not aware of the fact that anyone has even proposed to convert castor oil which has been treated with as much as 40 moles of propylene oxide into an acidic ester. Even if this were done, such product would not be nearly as satisfactory and nearly as effective as a demulsifying agent as the products herein described.

For purpose of comparison I have selected a phthalic acid derivative as a suitable fractional ester. The preparation of this product has been described previously. I have prepared a phthalic acid ester from castor oil which has been treated with four different ratios of propylene oxide, to wit, 40 moles, 60 moles, 100 moles and 120 moles. I have converted these derivatives into the phthalic acid ester. See Examples 1b, 6b, 16b and 26b, preceding.

I have tested these four products in the conventional manner which in essence corresponds to the description which appears in a booklet entitled "Treating Oil Field Emulsions," used in the Vocational Training Group, Petroleum Industries Series, of the American Petroleum Institute.

Following is a table showing tests on various oil emulsions. These tests were made with the undiluted product of the present invention for simplicity. The first test in each instance was made with Example 1b, which is not intended to illustrate this invention, as mentioned in the preceding examples elsewhere, but is intended only to show the superiority of the highly oxypropylated derivatives by comparison. Example 1b involved the use of 40 moles of propylene oxide per castor oil molecule.

In the table three factors are mentioned, "Color" and "Water" and "Overall Demulsification Rating." The color of the oil emulsion is examined in two ways; one, by reflected light, and, two, by transmitted light. Thus,

TABLE 4

| Ex. No. | Ex. No. of acidic ester | Oil field | Ratio | Color | Water | Overall demulsification rating |
|---|---|---|---|---|---|---|
| 1c | 1b | Hastings, Tex. | 1:6,500 | X | X | No treatment. |
| 2c | 6b | ----do---- | 1:6,500 | Fair, poor | Fair, fair | Fair. |
| 3c | 16b | ----do---- | 1:6,500 | Dark, fair | Good, clean | Good. |
| 4c | 26b | ----do---- | 1:6,500 | Dark, bright | Fast, clean | Excellent. |
| 5c | 1b | Government Wells, Tex. | 1:13,000 | X | Fair, sludges | Unsatisfactory. |
| 6c | 6b | ----do---- | 1:13,000 | Poor, poor | ----do---- | Poor. |
| 7c | 16b | ----do---- | 1:13,000 | Dark, bright | Good, clean | Excellent. |
| 8c | 26b | ----do---- | 1:13,000 | ----do---- | Fast, clean | Do. |
| 9c | 1b | Greta, Tex. | 1:8,500 | X | Poor, sludges | Unsatisfactory. |
| 10c | 6b | ----do---- | 1:8,500 | Dark, fair | Good, clean | Good. |
| 11c | 16b | ----do---- | 1:8,500 | Dark, bright | ----do---- | Excellent. |
| 12c | 26b | ----do---- | 1:8,500 | ----do---- | ----do---- | Do. |
| 13c | 1b | Friendswood, Tex. | 1:11,000 | X | X | No treatment. |
| 14c | 6b | ----do---- | 1:11,000 | Dark, fair | Fair, sludges | Fair. |
| 15c | 16b | ----do---- | 1:11,000 | Dark, bright | Good, clean | Very good. |
| 16c | 26b | ----do---- | 1:11,000 | ----do---- | Fast, clean | Excellent. |
| 17c | 1b | El Campo, Tex. | 1:10,000 | X | X | No treatment. |
| 18c | 6b | ----do---- | 1:10,000 | Poor, poor | Fair, sludges | Poor. |
| 19c | 16b | ----do---- | 1:10,000 | Dark, good | Good, clean | Good. |
| 20c | 26b | ----do---- | 1:10,000 | Dark, bright | Fast, clean | Excellent. |
| 21c | 1b | Eagle Hill, Alice, Tex. | 1:13,000 | X | Poor, sludges | Unsatisfactory. |
| 22c | 6b | ----do---- | 1:13,000 | Fair, fair | Fair, sludges | Fair. |
| 23c | 16b | ----do---- | 1:13,000 | Dark, good | Fast, clean | Excellent. |
| 24c | 26b | ----do---- | 1:13,000 | Dark, bright | ----do---- | Do. | the words "Fair, poor" would indicate fair appearance by reflection, poor appearance by transmission. By this means one experienced in the art can tell very closely if the emulsion has been completely broken.

The term "Water" also refers to two factors. One, the rate at which the water is released from the emulsion and, two, the degree to which it is released. In explanation of rate, some compounds will cause the water to fall out much faster than others, although the same amount of water may eventually be removed. Obviously, the faster rate is the more desirable. In explanation of degree of release, some compounds will cause the water to come out in the form of sludge rather than clean salt water. Thus, a compound allowing the water to be released cleanly and freely is more desirable than one producing a sludge-containing water. As an example, the phrase "Good, sludges" would mean that the water came out of the emulsion rather quickly but came out as a sludge, whereas "Poor, clean" would indicate that although the water came out very clean it took a long time to do so. Obviously, it is desirable to have a compound which will drop out the water both rapidly and cleanly as the compounds of the present invention will do.

Also, in the table the letter "X" indicates none or negligible de-emulsification.

Having thus described my invention what I claim as new and desire to secure by Letters Patent is:

1. A process for breaking petroleum emulsions of the water-in-oil type characterized by subjecting the emulsion to the action of a demulsifier including synthetic hydrophile products; said synthetic hydrophile products being acidic fractional esters obtained by reaction between (A) a polycarboxy acid, and (B) excessively oxypropylated triricinolein with the proviso that (1) there be introduced at least 20 moles of propylene oxide per ricinoleyl radical, and that (2) there be employed at least one mole of the carboxy reactant for each reactive hydroxyl radical.

2. A process for breaking petroleum emulsions of the water-in-oil type characterized by subjecting the emulsion to the action of a demulsifier including synthetic hydrophile products; said synthetic hydrophile products being acidic fractional esters obtained by reaction between (A) a polycarboxy acid, and (B) excessively oxypropylated triricinolein with the proviso that (1) there be introduced at least 20 moles and not over 50 moles of propylene oxide per ricinoleyl radical, and that (2) there be employed at least one mole of the carboxy reactant for each reactive hydroxyl radical.

3. A process for breaking petroleum emulsions of the water-in-oil type characterized by subjecting the emulsion to the action of a demulsifier including synthetic hydrophile products; said synthetic hydrophile products being acidic fractional esters obtained by reaction between (A) a polycarboxy acid, and (B) excessively oxypropylated triricinolein with the proviso that (1) there be introduced at least 20 moles and not over 40 moles of propylene oxide per ricinoleyl radical, and that (2) there be employed at least one mole of the carboxy reactant for each reactive hydroxyl radical.

4. A process for breaking petroleum emulsions of the water-in-oil type characterized by subjecting the emulsion to the action of a demulsifier including synthetic hydrophile products; said synthetic hydrophile products being acidic fractional esters obtained by reaction between (A) a polycarboxy acid, and (B) excessively oxypropylated triricinolein with the proviso that (1) there be introduced at least 20 moles and not over 40 moles of propylene oxide per ricinoleyl radical, and that (2) there be employed at least one mole of the carboxy reactant for each reactive hydroxyl radical; and with the further proviso that the triricinolein employed be in the form of commercial castor oil.

5. A process for breaking petroleum emulsions of the water-in-oil type characterized by subjecting the emulsion to the action of a demulsifier including synthetic hydrophile products; said synthetic hydrophile products being acidic fractional esters obtained by reaction between (A) a polycarboxy acid, and (B) excessively oxypropylated triricinolein with the proviso that (1) there be introduced at least 30 moles and not over 40 moles of propylene oxide per ricinoleyl radical, and that (2) there be employed at least one mole of the carboxy reactant for each reactive hydroxyl radical; and with the further proviso that the triricinolein employed be in the form of commercial castor oil.

6. A process for breaking petroleum emulsions of the water-in-oil type characterized by subjecting the emulsion to the action of a demulsifier including synthetic hydrophile products; said synthetic hydrophile products being acidic fractional esters obtained by reaction between (A) a dicarboxy acid, and (B) excessively oxypropylated triricinolein with the proviso that (1) there be introduced at least 30 moles and not over 40 moles of propylene oxide per ricinoleyl radical, and that (2) there be employed at least one mole of the carboxy reactant for each reactive hydroxyl radical; and with the further proviso that the triricinolein employed be in the form of commercial castor oil.

7. A process for breaking petroleum emulsions of the water-in-oil type characterized by subjecting the emulsion to the action of a demulsifier including synthetic hydrophile products; said synthetic hydrophile products being acidic fractional esters obtained by reaction between (A) a dicarboxy acid characterized by being free from any radical having more than 8 carbon atoms in any single group, and (B) excessively oxypropylated triricinolein with the proviso that (1) there be introduced at least 30 moles and not over 40 moles of propylene oxide per ricinoleyl radical, and that (2) there be employed at least one mole of the carboxy reactant for each reactive hydroxyl radical; and with the further proviso that the triricinolein employed be in the form of commercial castor oil.

8. The process of claim 7 wherein the dicarboxy acid is phthalic acid.

9. The process of claim 7 wherein the dicarboxy acid is maleic acid.

10. The process of claim 7 wherein the dicarboxy acid is succinic acid.

11. The process of claim 7 wherein the dicarboxy acid is citraconic acid.

12. The process of claim 7 wherein the dicarboxy acid is diglycolic acid.

References Cited in the file of this patent

UNITED STATES PATENTS

| Number | Name | Date |
| --- | --- | --- |
| 2,307,058 | Moeller | Jan. 4, 1943 |
| 2,562,878 | Blair | Aug. 7, 1951 |
| 2,602,064 | De Groote | July 1, 1952 |
| 2,605,232 | De Groote | July 29, 1952 |